United States Patent
Daly, Jr. et al.

(10) Patent No.: US 9,813,499 B2
(45) Date of Patent: Nov. 7, 2017

(54) VIRTUAL STORAGE SYSTEM AND METHOD OF SHARING ACCESS TO THE VIRTUAL STORAGE SYSTEM FOR ADDING ELECTRONIC DOCUMENTS

(71) Applicant: DigitalMailer, Inc., Herndon, VA (US)

(72) Inventors: Ronald M. Daly, Jr., Centreville, VA (US); Leonard Giambalvo, Fort Mill, SC (US); Robert Jacob Smilie, Concord, NC (US)

(73) Assignee: Virtual Strongbox, Inc., Cornelius, NC (US)

( * ) Notice: Subject to any disclaimer, the term of this patent is extended or adjusted under 35 U.S.C. 154(b) by 274 days.

(21) Appl. No.: 13/948,194

(22) Filed: Jul. 23, 2013

(65) Prior Publication Data
US 2015/0032840 A1    Jan. 29, 2015

(51) Int. Cl.
*G06F 15/167*    (2006.01)
*H04L 29/08*    (2006.01)
*H04L 29/06*    (2006.01)

(52) U.S. Cl.
CPC ........ *H04L 67/1097* (2013.01); *H04L 63/102* (2013.01); *H04L 67/02* (2013.01); *H04L 67/10* (2013.01)

(58) Field of Classification Search
CPC ..... H04L 67/1097; H04L 67/02; H04L 67/10; H04L 63/102
USPC ................................. 709/213, 216–217, 219
See application file for complete search history.

(56) References Cited

U.S. PATENT DOCUMENTS

| | | | | |
|---|---|---|---|---|
| 7,643,468 | B1 * | 1/2010 | Arregoces | H04L 12/462 370/351 |
| 8,473,585 | B1 * | 6/2013 | Smith | H04L 67/1097 709/218 |
| 8,706,834 | B2 * | 4/2014 | Sorenson, III | G06F 3/0607 709/214 |
| 8,789,208 | B1 * | 7/2014 | Sundaram | H04L 29/06 726/28 |
| 8,793,343 | B1 * | 7/2014 | Sorenson, III | G06F 17/30203 709/219 |
| 9,436,842 | B2 * | 9/2016 | Purohit | G06F 17/30194 |
| 9,635,092 | B2 * | 4/2017 | Tang | H04L 67/06 |
| 2007/0192487 | A1 * | 8/2007 | Jakobson | G06F 21/554 709/225 |

(Continued)

*Primary Examiner* — Thu Ha Nguyen
(74) *Attorney, Agent, or Firm* — Brundidge & Stanger, P.C.

(57) ABSTRACT

A virtual storage system in data communication with a user computing device via a communication network and methods of sharing access to the virtual storage system that includes at least one processor that receives a request for granting share access of at least one electronic folder of a plurality of electronic folders, and for adding at least one electronic document therein, and input information including upload link information and expiration information corresponding to the share access of the electronic folder, as input by a user, and creates at least one upload link corresponding to the electronic folder based on the input information, for granting share access to a recipient of the at least one upload link. The virtual storage system also includes a plurality of redundant physical storage devices in data communication with the processor and storing the electronic document to be uploaded, and the upload link created.

9 Claims, 16 Drawing Sheets

(56) References Cited

U.S. PATENT DOCUMENTS

| | | | |
|---|---|---|---|
| 2009/0089404 A1* | 4/2009 | Guo | H04L 67/02 709/219 |
| 2010/0011416 A1* | 1/2010 | Wagner | G06F 21/6218 726/4 |
| 2010/0082713 A1* | 4/2010 | Frid-Nielsen | G06F 17/301 707/821 |
| 2011/0231490 A1* | 9/2011 | Inoue | H04L 29/08729 709/204 |
| 2012/0290676 A1* | 11/2012 | Leong | G06F 17/30073 709/213 |
| 2012/0317280 A1* | 12/2012 | Love | G06F 9/5072 709/224 |
| 2013/0007219 A1* | 1/2013 | Sorenson, III | H04L 67/1095 709/219 |
| 2013/0117376 A1* | 5/2013 | Filman | G06Q 10/10 709/205 |
| 2013/0198620 A1* | 8/2013 | Zhou | G06F 17/217 715/255 |
| 2013/0204849 A1* | 8/2013 | Chacko | G06F 3/0604 707/692 |
| 2013/0238553 A1* | 9/2013 | Kim | G06F 17/30575 707/610 |
| 2013/0305039 A1* | 11/2013 | Gauda | G06F 21/6218 713/153 |
| 2014/0018947 A1* | 1/2014 | Ales | G11B 20/10 700/94 |
| 2014/0122886 A1* | 5/2014 | Lee | G06F 21/00 713/171 |
| 2014/0136807 A1* | 5/2014 | Brown | G06F 3/06 711/164 |
| 2014/0137273 A1* | 5/2014 | Workman | G06F 21/6218 726/32 |
| 2014/0279873 A1* | 9/2014 | Somerfield | G06F 17/30132 707/610 |
| 2015/0012639 A1* | 1/2015 | McLean | H04L 67/1097 709/224 |
| 2015/0067109 A1* | 3/2015 | Tang | H04L 67/1097 709/219 |
| 2015/0381735 A1* | 12/2015 | Pascual | G06F 3/0484 715/753 |
| 2016/0028821 A1* | 1/2016 | Petisce | A61B 5/0022 709/219 |
| 2016/0323381 A1* | 11/2016 | Huang | H04L 67/1097 |

* cited by examiner

902 — a list of accounts is accessed and displayed via the external system

904 — The authorized party at the external system can select an account of a user having a user-specific virtual storage system to gain access to and add electronic documents 906 — The authorized party accesses the electronic folder of the user's virtual storage system as selected by the authorized party and selects an add link to add an electronic document to the electronic folder selected 908 — The authorized party then selects and uploads an electronic document to the electronic folder selected.

910 — The authorized party selects the uploaded electronic document to be deleted if necessary and selects an electronic document to be uploaded to the electronic folder selected.

| Account | Last Name | First Name | Primary Email Address | Elert Email Address |
|---|---|---|---|---|
| 9999 | Demo | Doug | XXXX@XXXXXXX.com | XXXX@XXXXXXX.com |
| 9998 | Baldi | Amy | XXXX@XXXXXXX.com | XXXX@XXXXXXX.com |
| 99999 | Demo | Doug | XXXX@XXXXXXX.com | |
| 9 | Crandell | Greg | XXXX@XXXXXXX.com | |
| 5511 | Benz | Wade | XXXX@XXXXXXX.com | |
| 6453 | Test | Traci | XXXX@XXXXXXX.com | |
| 66727 | Test | Traci | XXXX@XXXXXXX.com | |
| 74554 | Test | Traci | XXXX@XXXXXXX.com | |
| 5604 | Test | Traci | XXXX@XXXXXXX.com | |
| 20099559 | Not so Test | Traci | XXXX@XXXXXXX.com | |
| 540104 | Test-McNamara | Traci | XXXX@XXXXXXX.com | |
| 43492 | Tester | Traci M. | XXXX@XXXXXXX.com | |
| 20099004 | Test | Tracy | XXXX@XXXXXXX.com | |
| 20091219 | Test | Traci | XXXX@XXXXXXX.com | |
| 42702 | Test | Traci | XXXX@XXXXXXX.com | |
| 920099001 | Test | Traci | XXXX@XXXXXXX.com | |
| 920142285 | Test | Traci | XXXX@XXXXXXX.com | |

FIG. 10

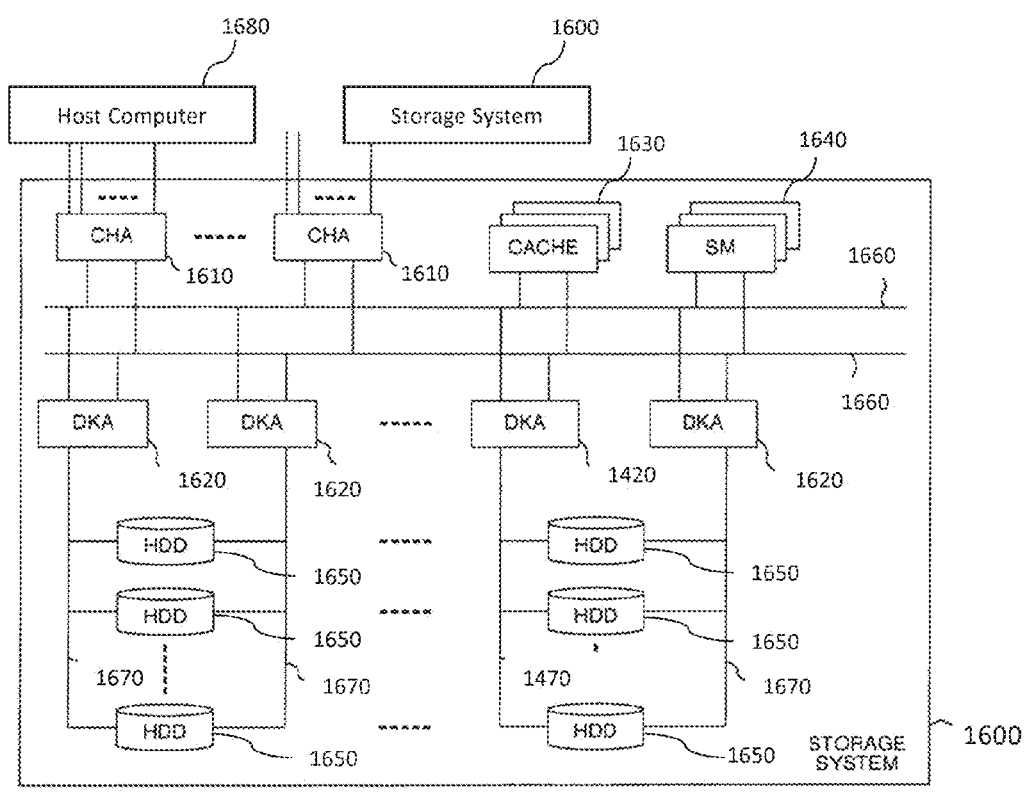

VIRTUAL STORAGE SYSTEM AND METHOD OF SHARING ACCESS TO THE VIRTUAL STORAGE SYSTEM FOR ADDING ELECTRONIC DOCUMENTS

CROSS-REFERENCE TO RELATED APPLICATIONS

The present application relates to co-pending application entitled "Virtual Storage System and Method of Copying Electronic Documents into the Virtual Storage System" by Ronald M. Daly, Jr. et al. filed on Jan. 28, 2013; co-pending application entitled "Virtual Storage System and Method of Sharing Electronic Documents within the Virtual Storage System" by Ronald M. Daly, Jr. et al. filed on Jan. 28, 2013; co-pending application entitled "Virtual Storage System and File Encryption Methods" by Ronald M. Daly, Jr. et al. filed on Jan. 28, 2013; and co-pending application entitled "Virtual Storage System and File Storing Method" by Ronald M. Daly, Jr. et al. filed on Jan. 28, 2013, the entire disclosures of which are incorporated herein by reference.

BACKGROUND OF THE INVENTION

1. Field of the Invention

The present invention relates to a virtual storage system. More particularly, the present invention relates to a virtual storage system and methods of sharing access to the virtual storage system for adding electronic documents to the virtual storage system.

2. Description of the Related Art

Virtual storage systems have become a popular alternative for storing files, thereby eliminating the need to install physical storage devices and minimizing file storage costs. A virtual storage system is an online storage system where data is stored in virtual storage pools. The pools are hosted by third parties that operate large data centers. The third parties virtualize resources in servers and present the resources as virtual storage pools for users to store files, for example. The virtual storage system is accessed through a web application programming interface (API), a gateway or a Web-based user interface (UI), for example. A typical virtual storage system (e.g., a cloud-type storage system) has several disadvantages which create security concerns. For example, the storage location of the files stored therein may be unknown to both third party hosting companies and/or users of the virtual storage system. In addition, the typical virtual storage system can be easily accessed over a communication network (e.g., the Internet) using simple single-factor authentication processes for access thereof. The typical virtual storage system does not encrypt files that are stored on their servers which makes the files easily visible to internal employees and hackers. Further, the typical virtual storage system is not Pci compliant (PCI DSS) a proprietary information security standard for organizations that handle cardholder information for the major debit, credit, prepaid, e-purse, ATM, and POS cards. Further, once any file is stored on the virtual storage system they become property of the virtual storage system provider and are no longer user-owned; therefore the files can be used for other purposes, such as data mining without user permission.

Online banking systems provide resources to enable users to conduct banking transactions electronically from a personal computer, for example. These banking transactions include monitoring accounts, conducting money transfers, applying for loans, submitting loan payments, etc. However, users are required to visit the bank in person, to conduct other transactions such as depositing important documents into a safe deposit box which is an individually secured container held in a bank vault. The safe deposit box is used for storing valuable possessions, such as jewelry, currency, marketable securities, and important documents (e.g., bank statements, wills, passports, property deeds, insurance policies, photographs and birth certificates). Bank personnel typically open the bank vault with a key and a user is required to produce an assigned key to open the safe deposit box.

Currently, online banking systems fail to allow users to store important documents electronically, and also fail to allow users to retrieve, view or share these documents electronically outside of the bank environment, when desired.

SUMMARY OF THE INVENTION

The present invention obviates the above-mentioned disadvantages by providing a virtual storage system that implements a methods sharing access to the virtual storage system as needed. Third parties (e.g., banking personnel) may add electronic documents to a user's virtual storage system upon being granted access by the user.

Further, the virtual storage system of present invention employs a multi-factor authentication process for verifying user access rights, via a specifically-designed application programming interface (API), for example, that can be installed at a user computing device, thereby providing a maximum security level of file storage for the user.

The virtual storage system of the present invention is also Pci compliant following a proprietary information security standard to allow storage of cardholder information for the major debit, credit card, prepaid, e-purse, ATM, and POS cards.

In addition, the virtual storage system locks each file with encryption as it is uploaded or copied, and only the user-owner holds the key (i.e., access rights) to retrieve the file, thereby leaving ownership of the file with the user-owner at all times and providing extra security protection from unauthorized individuals.

The present invention provides a virtual storage system in data communication with a user computing device via a communication network that includes at least one processor that receives a request for granting share access of at least one electronic folder of a plurality of electronic folders, and for adding at least one electronic document therein, and input information including upload link information and expiration information corresponding to the share access of the electronic folder, as input by a user, and creates at least one upload link corresponding to the electronic folder based on the input information, for granting share access to a recipient of the at least one upload link. The virtual storage system also includes a plurality of redundant physical storage devices in data communication with the processor and storing the electronic document to be uploaded, and the upload link created.

Further, the present invention provides a method implemented by computer system to effect the granting of share access of at least one electronic folder of a plurality of electronic folders within a virtual storage system including at least one processor in data communication via a communication network with a user computing device, and a plurality of redundant storage devices, the method includes accessing the virtual storage system via the user computing device, selecting and viewing the at least one electronic folder of the plurality of electronic to be shared with a recipient, receiving from the user computing device, a request for granting share access of the at least one electronic folder, determining, via the user, upload link information corresponding to the share access to the at least one electronic folder, determining, via the user, expiration information corresponding to the uploading of the at least one electronic document to the at least one electronic folder, creating at least one upload link corresponding to the share access based on the upload link information and the expiration information, for granting share access of the at least one electronic folder with a recipient, and storing, via the physical redundant storage devices, the at least one electronic document and the at least one upload link created.

Further, the present invention provides a method implemented by computer system to effect the granting of share access of at least one electronic folder of a plurality of electronic folders within a virtual storage system including at least one processor in data communication via a communication network with a user computing device, and a plurality of redundant storage devices is provided. The method includes accessing, via a party, an external system in data communication with the virtual storage system of a user, accessing, via the party, an account of the external system corresponding to the virtual storage system, accessing, via the party, the virtual storage system and at least one electronic folder of the plurality of electronic folders, uploading, via the party, at least one electronic document to the at least one electronic folder, and storing, via the physical redundant storage devices, the at least one electronic document.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 9 is a flowchart illustrating a method for sharing access to the virtual storage system for adding electronic documents to the virtual storage system according to one or more embodiments of the present invention.

FIG. 10 is a screen shot of an external banking system where share access is granted for accessing the virtual storage system and adding electronic documents thereto that can be implemented within one or more embodiments of the present invention.

FIG. 16 is a block diagram of an exemplary physical storage system for implementation of the virtual storage system in accordance with one or more embodiments of the present invention.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention as will be described in greater detail below provides a method of granted share access of the user-specific virtual storage system to add electronic documents, (e.g., a will, a deed, real estate closing papers or a banking statement) to the user-specific virtual storage system. The present invention provides various embodiments as described below. However it should be noted that the present invention is not limited to the embodiments described herein, but could extend to other embodiments as would be known or as would become known to those skilled in the art.

Figure 1:
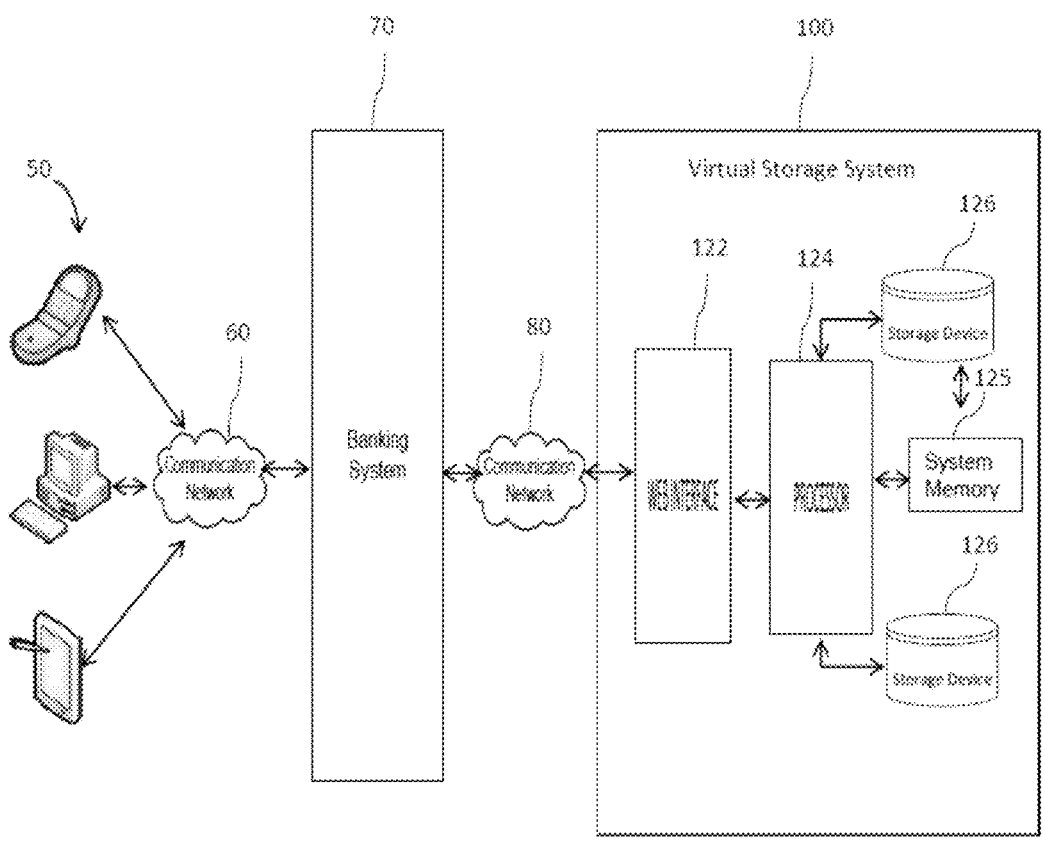
FIG. 1 is a block diagram of a virtual storage system that can be implemented within one or more embodiments of the present invention.

FIG. 1 is a block diagram of a virtual storage system implemented within one or more embodiments of the present invention. In FIG. 1, a user at a user computing device 50 is configured to access, via a communication network 60, an external system i.e., an online document retrieval and storage system such as a banking system 70, to perform online banking transactions, such as viewing bank accounts and bank statements, applying for loans, and other transactions. According to one or more embodiments, the user computing device 50 includes at least one of a mobile phone or smart phone, a personal computer or laptop, a personal digital assistant (PDA), or tablet. The present invention is not limited to any particular type of user computing device 50, and may vary accordingly.

The user accesses the banking system 70 by inputting input data including identification and log-in information such as a user ID and password via a user interface (UI) of the user computing device 50. Once the identification/log-in information is received at a banking application of the banking system 70, the banking system 70 retrieves the user's banking information and displays the banking information via a display of the user computing device 50. The banking system 70 is configured to receive the input data and provide the user with electronic documents (e.g., bank statements) in webpage format or any other format over the communication network 60. The banking system 70 communicates via a communication network 80, with a virtual storage system 100 described in detail below.

The communication networks 60 and 80 include a wired or wireless network for data communication. The data communication across the communication networks 60 and 80 is achieved by using web services technology including for example, Web services Description Language (WSDL). The communication networks 60 and 80 may include any subsystem for exchanging data such as the Internet, intranet, extranet, wide area network (WAN), local area network (LAN), Restful web services, JAVAScript Object Notation (JSON), Extensible Mark-up Language (XML)-based communication network, Simple Object Access Protocol (SOAP)-based Services and satellite communication network. Further, the communication networks 60 and 80 can be other types of networks such as interactive television (ITV). According to one or more embodiments, the communication networks 60 and 80 may be the same or different types of networks.

The virtual storage system 100 is a user-specific storage system which allows each user to have a secure access to their files stored within the virtual storage system 100. In addition, the virtual storage system 100 encrypts each electronic document as it is retrieved from the external system, and only the user-owner can access the electronic document thereby leaving ownership of the files within the virtual storage system 100 with the user-owner at all times.

According to one or more embodiments, the virtual storage system 100 includes a web interface 122 for interfacing with the external system (e.g., the banking system 70) over the communication network 80. The web interface 122 provides secure connection to the virtual storage system 100. According to one or more embodiments, the web interface 122 is a specifically-designed application programming interface (API), for example, which performs authentication of the user or the external system (e.g., the banking system 70) at multiple levels. A secure connection is made between the banking system 70 and the virtual storage system 100 on a transport layer level, for example. According to one or more embodiments, a transport layer security (TLS) or secure sockets layer (SSL) cryptographic protocol may be employed to provide secure communication over the communication networks 60 and 80. According to one or more embodiments, the web interface 122 is a web application programming interface (API), a gateway or a Web-based user interface (UI), for example.

According to one or more embodiments, the virtual storage system 100 is Pci compliant to allow storage of cardholder information for major debit, credit, prepaid, e-purse, ATM and POS cards.

The virtual storage system 100 further includes at least one processor 124 for receiving information including requests from the user at the banking system 70 and processing the requests, such as storing and retrieving electronic documents. The virtual storage system 100 further includes a system memory 125 and at least one storage server comprising a plurality of physical storage devices 126 for storing files such as electronic documents, audio files, photographs, movies, and images received from the user via the banking system 70. The system memory 125 may retrieve the electronic data and any instructions/rules from the storage devices 126 and loads the electronic data and instructions/rules into the processor 124 for processing. According to an embodiment of the present invention, the files can be stored in any format, for example, Hyper Text Markup Language (HTML), portable document format (PDF) or any other suitable format. The virtual storage system 100 acts as a safe deposit box for receiving and securely storing the files received from the user via the banking system 70. Although only one processor 124 and two storage devices 126 are shown, the present invention is not limited hereto, and may vary accordingly.

As shown in FIG. 1, the virtual storage system 100 includes a web interface (e.g., the web interface 122) however the present invention is not limited to this particular configuration, and may vary accordingly.

Figure 2:
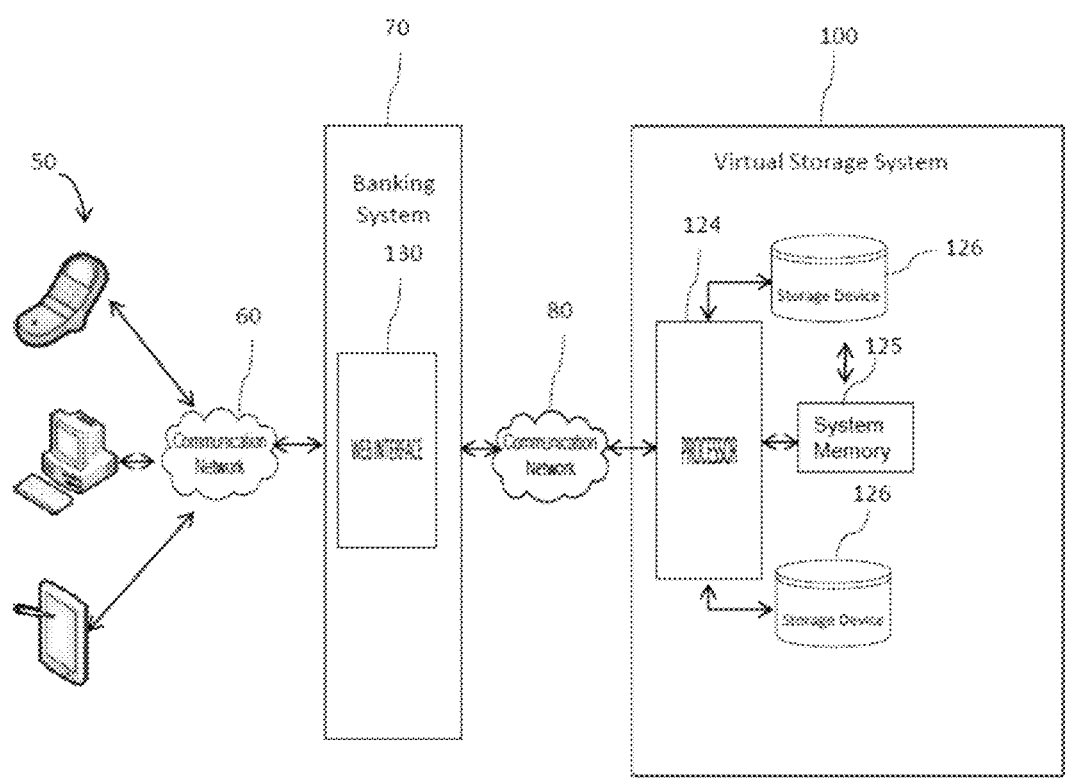
FIG. 2 is a block diagram of a virtual storage system that can be implemented within alternative embodiments of the present invention.
Figure 3:
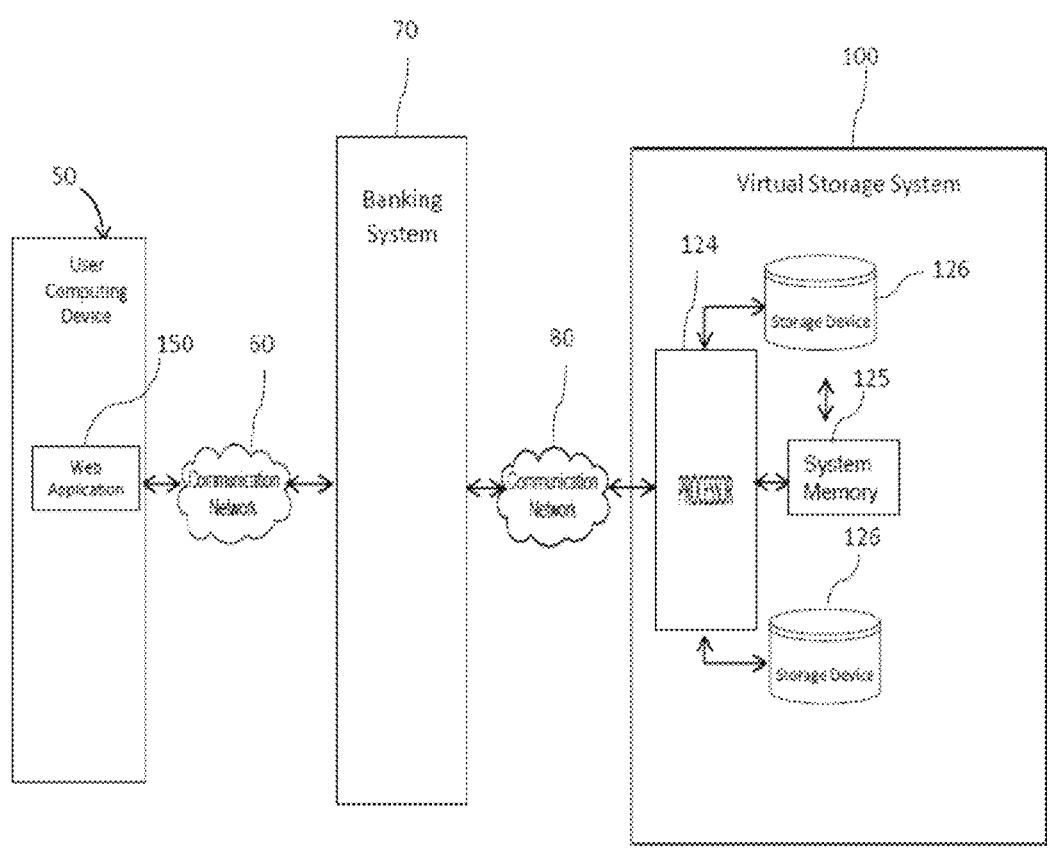
FIG. 3 is a block diagram of a virtual storage system that can be implemented within alternative embodiments of the present invention.
Figure 4:
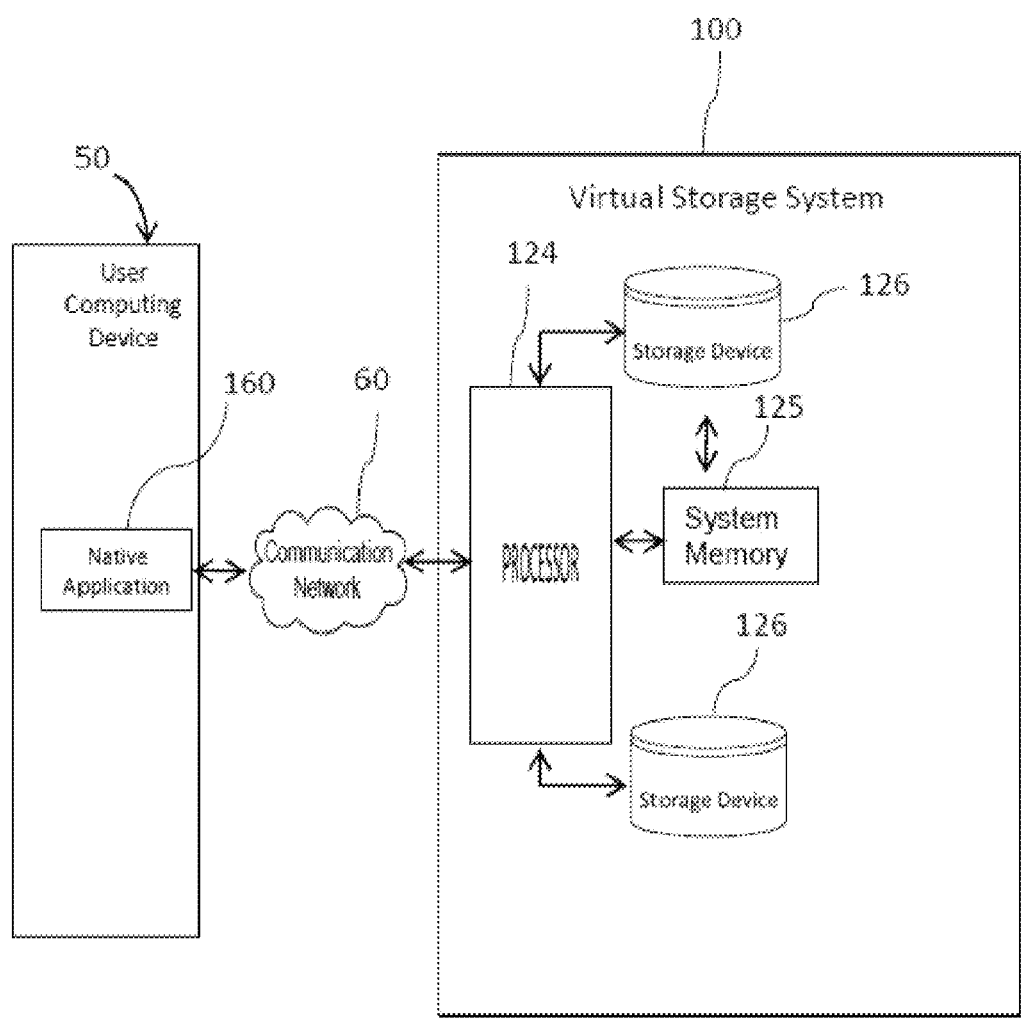
FIG. 4 is a block diagram of a virtual storage system that can be implemented within alternative embodiments of the present invention.

FIGS. 2 through 4 illustrate alternative configurations of the virtual storage system 100, and communication between the virtual storage system 100, the external system (e.g., the banking system 70), and/or the user computing device 50 according to other embodiments of the present invention that may be implemented. Some of the components shown in FIGS. 2 through 4 are the same as the components discussed above with reference to FIG. 1 therefore a detailed description of these components is omitted.

As shown in FIG. 2, in an alternative embodiment, the banking system 70 includes a web interface 130 configured to interface the banking system 70 with the virtual storage system 100 over the communication network 80. The web interface 130 functions in a similar manner as the web interface 122 of the virtual storage system 100 therefore in this embodiment, the web interface 122 of the virtual storage system 100 is omitted.

As shown in FIG. 3, in another alternative embodiment, the user computing device 50 includes a web application 150 (e.g., a web API) for connecting to the banking system 70 and the virtual storage system 100 indirectly through the banking system 70. The web application 150 is an internet-enabled application, for example, that has specific functionality for the user computing device 50 (e.g., a mobile phone). The web application 150 is accessed through a web browser of the user computing device 50 and does not require downloading and installing thereof onto the user computing device 50.

As shown in FIG. 4, in yet another alternative embodiment, the user computing device 50 includes a native application 160 for connecting directly to web services (i.e., the processor 124) of the virtual storage system 100. The native application 160 is directly installed on the user computing device 50 to allow the user to gain direct access to the virtual storage system 100. The native application 160 is a specifically-designed API for accessing the virtual storage system 100. For example, if the user computing device 50 is a tablet, the tablet may include a tablet API for directly accessing the web services of the virtual storage system 100. Therefore, in this embodiment, the web interface 130 of the banking system 70 as shown in the embodiment illustrated in FIG. 2; and the web interface 122 of the virtual storage system 100 as shown in FIG. 3 are omitted.

According to one or more embodiments, the native application 160 may include a multi-factor authentication process to be performed at many levels to enable a user to gain direct access to the virtual storage system 100 from the user computing device 50. The multi-factor authentication process may include steps such as sending login information (e.g., user ID and password information) in a correspondence (e.g., a text message or email) to the user, and providing a time-based one-time password system to the user via a third party.

According to another embodiment, a single-factor authentication process may be used to gain access to the virtual storage system 100 via the external system (e.g., the banking system 70) since the external system and the virtual storage system 100 communicate via a secure connection on the communication network 80.

It should be noted that the virtual storage system 100 as shown in FIGS. 1 through 4 is implemented on a physical storage system 1600 such as that illustrated in FIG. 16.

As shown in FIG. 16, the physical storage system 1600 includes a plurality of host adapters (CHA) 1610, disk adapters (DKA) 1620, cache memories (CACHE) 1630, shared memories (SM) 1640, and hard disk drives (HDD) 1650 connected with each other via common paths 1660 and connection lines 1670. Each of the hard disk drives (HDD) 1450 is connected to two disk adapters 1620, for example, using different connection lines 1670. The host adapters 1610 control data transfer between host computers 1480, the cache memories 1630 and the hard disk drives 1650. The cache memories 1630 temporarily store data received from the host computer 1680 and data read from the hard disk drives 1650. The shared memories 1640 are shared between the host adapters 1610 and the disk adapters 1620. The present invention is not limited to any particular number of host adapters 1610, disk adapters 1620, cache memories 1630, shared memories 1640 and hard disk drives 1650, and may vary accordingly. The physical storage system 1600 is one example of a physical storage system for which the virtual storage system can be implemented thereon. The present invention is not limited to a particular configuration of the physical storage system. According to other embodiments, the hard disk drives (HDD) 1650 can be replaced with a flash storage, RAM disks or rotated disk drives, for example. The host computers 1680 can be the processor 124 or a separate computer, for example. Further, the virtual storage system 100 can be implemented on any type of storage system such as a network-attached storage (NAS), a storage area network (SAN), or a distributed memory array.

Further, according to one or more embodiments, the physical storage devices of the physical storage system 1600 as described above can be configured in a RAID (Redundant Array of Independent Disks) configuration. Further, the reliability of the data stored in the storage devices 126 of the virtual storage system 100 can be stored in a redundant manner in redundant data centers using mirroring, remote copy, or the like. The use of redundant storage devices enables the data stored to be duplicated thereby preventing data loss.

When a user accesses the banking system 70 via a bank server, the user can be automatically directed to the virtual storage system 100 when desired.

As shown in FIGS. 1 through 4, the user computing device 50, banking system 70 and virtual storage system 100 can be connected with each other via the communication networks 60 and 80. According to one embodiment, the user computing device 50 may occasionally connect to the communication network 60 while the banking system 70 and the virtual storage system 100 may maintain a connection to the communication networks 60 and 80. Further, in FIG. 4, the user computing device 50 and the virtual storage system 100 are in direct communication with each other over the communication network 80.

According to alternative embodiments, the virtual storage system 100 can be included within the banking system 70 or the user computing device 50 as installable software.

Figure 5:
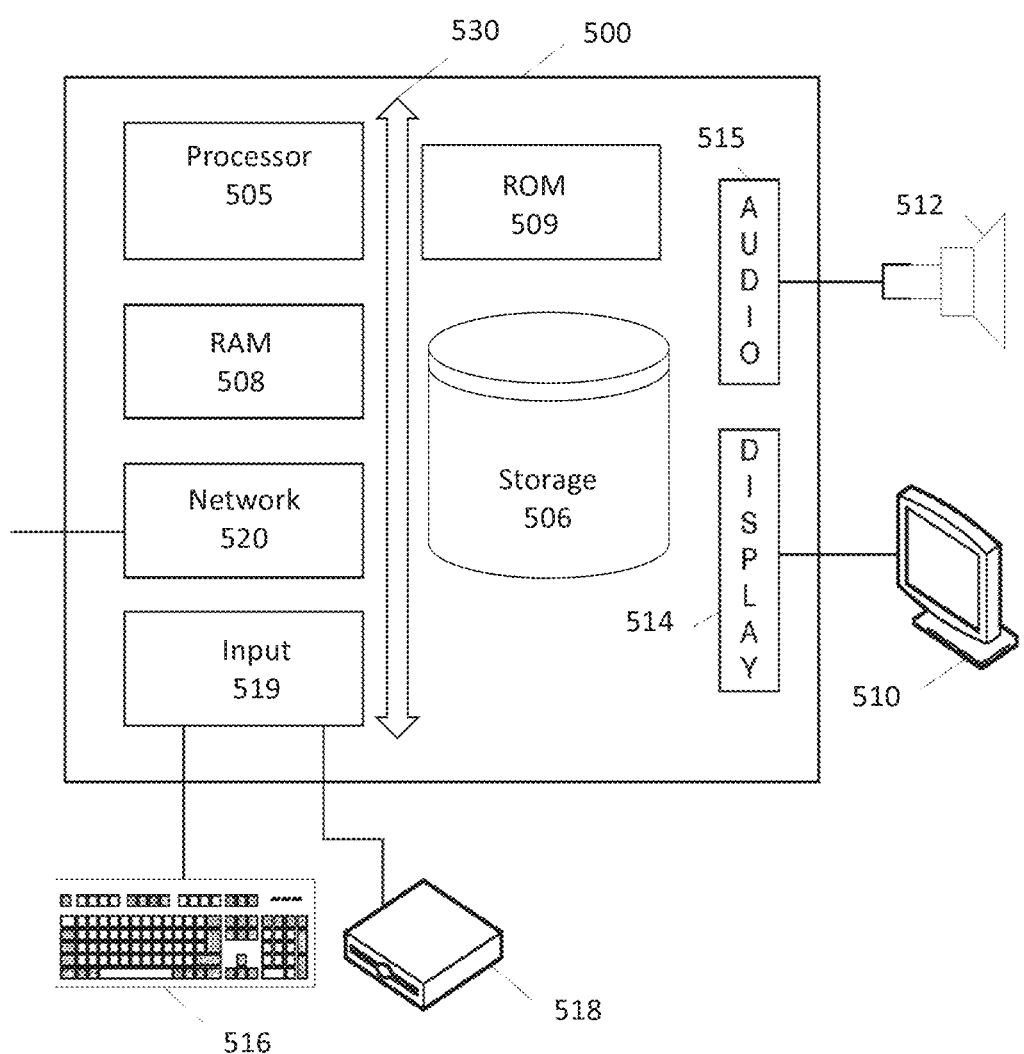
FIG. 5 is a block diagram of an exemplary computer to be implemented within one or more embodiments of the present invention.

FIG. 5 is a block diagram of an exemplary computing device 500 illustrating components of the computing device 50, the banking system 70 and the virtual storage system 100 shown in FIG. 1. As shown in FIG. 5, the computing device 500 includes various components for inputting, outputting, storing and processing data. The computing device 500 includes a processor 505 for performing tasks including executing one or more applications, retrieving data from a storage device e.g., storage 506, and/or outputting data. The processor 505 can be connected to a Random access memory (RAM) module 508 wherein application data and/or instructions may be temporarily stored. The computing device 500 can further includes a Read Only Memory (ROM) 509 configured to allow data stored thereon to persist after the computing device 500 is turned off and is used for storing an operating system (OS) of the computing device 500. The storage device 506 may also provide storage for data files and may include computer readable mediums e.g., disk drives, optical storage mediums e.g., CD ROM drives, magnetic tape storage systems, and flash memory. The processor 505 is configured to retrieve an application from the storage 506 and store the instructions associated with the application in the RAM module 508, while the processor 505 is executing the application. The computing device 500 further includes output devices e.g., a display device 510, and a speaker 512, for outputting visual and audio data via a display adapter 514 and an audio adapter 515. Further, the computing device 500 includes input devices e.g., a keyboard 516, a storage media drive 518, and microphone each having an associated adapter 519 for converting the input data into computer readable data. The storage media drive 518 enables users to read and write data to and from the storage media.

Further, as shown in FIGS. 1 through 4, the user computing device 50 includes one or more components for receiving and transmitting data over the communication networks 60 and 80. For example, a network adapter 520 is provided for communication with one or more computing devices over an IP network, for example, for transmission of data such as financial data over the banking system 70. The network adapter 520 may include instructions associated with processing IP network packets and cellular network packets. The components of the computing device 500 are connected via a system bus 530.

Figure 6:
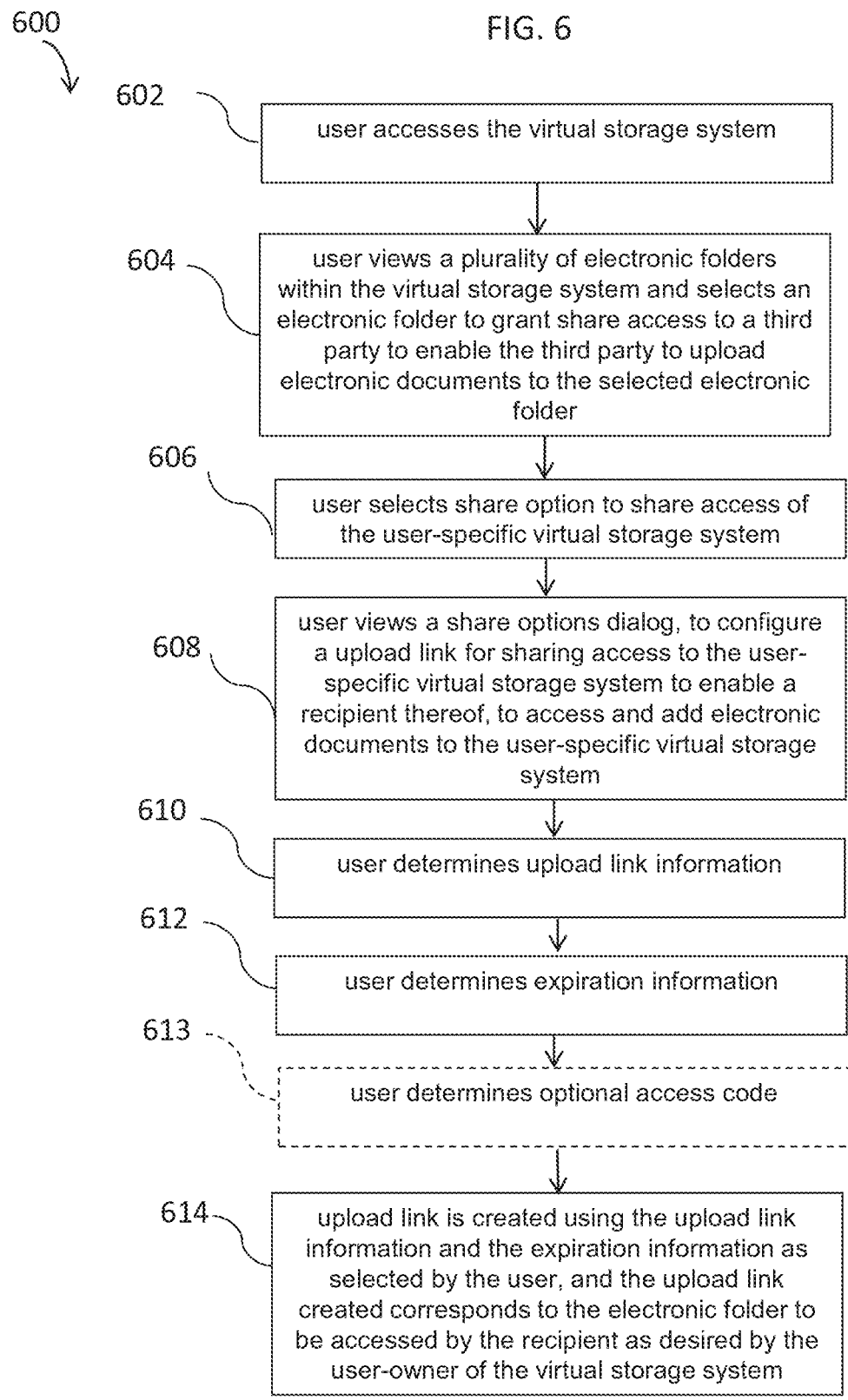
FIG. 6 is a flowchart illustrating a method for sharing access of the virtual storage system for adding electronic documents to the virtual storage system according to one or more embodiments of the present invention.

FIG. 6 is a flowchart illustrating a method 600 for illustrating a method of sharing electronic documents within the virtual storage system 100 of FIG. 1, for example, according to one or more embodiments of the present invention. The method 600 is implemented in software modules for execution by the user computing device 50, the banking system 70 and the virtual storage system 100.

In method 600, the online document retrieval and storage system (e.g., the banking system 70) receives input data from the user at the user computing device 50 for requesting access to online account information (e.g., banking information). At operation 602, the user accesses the virtual storage system 100. According to embodiments of the present invention, the user can access the virtual storage system 100 directly or indirectly via the banking system 70 (as shown in FIGS. 1 through 4).

From operation 602, the process continues to operation 604, where the user views a plurality of electronic folders within the virtual storage system and selects an electronic folder to grant share access to a third party to enable the third party to upload electronic documents to the selected electronic folder, as desired by the user.

From operation 604, the process continues to operation 606, where the user selects share option to share access of the user-specific virtual storage system. The share option is selected by the user from a plurality of option tabs (e.g., add file, create new folder, download document, rename document, delete document, and move document) available for selection, displayed to the user via the user display (e.g., display 514 depicted in FIG. 5). From operation 606, the process continues to operation 608 where the user views a share options dialog, to configure a upload link for sharing access to the user-specific virtual storage system to enable a recipient thereof, to access and add electronic documents to the user-specific virtual storage system.

From operation 608, the process continues to operations 610 and 612, where the user determines and inputs input information, via the share options dialog. According to one or more embodiments, the input information includes upload link information and expiration information corresponding to the electronic folder access to be granted. An optional upload code may also be assigned by the user to be input by the recipient to thereby access the electronic folder as granted.

In operation 610, the user determines the upload link information. According to one or more embodiments, the user determines a number of times the recipient of the upload link can upload documents by the recipient. The user can select from one (1) time to multiple times that the recipient can upload the electronic document. The number of times as selected by the user is stored, to be included in the upload link created.

In operation 612, the user then determines the expiration information. According to one or more embodiments, the user selects an expiration period for uploading the electronic documents by the recipient. For example, the user can select a predetermined number of hours or days before the upload link is to expire. According to an embodiment of the present invention, the expiration period can be zero (0) days (i.e., no expiration date) or one or more days, as desired by the user. The expiration period information is also stored, to be included in the upload link created.

From operation 612, the process continues to operation 613 where the user may determine an optional access code e.g., an alphanumeric code to be input by the recipient, to thereby complete the upload process of an electronic document into the virtual storage system 100.

The process then continues to operation 614, where the upload link is created using the upload link information and the expiration information and optional access code as selected by the user, and the upload link created corresponds to the electronic folder to be accessed by the recipient as desired by the user-owner of the virtual storage system. The user then has an option to either copy and paste upload link created in a communication (e.g., email or text) to the recipient or generate the communication (e.g., email or text) directly within the virtual storage system, for sending the upload link to the recipient.

According to an embodiment of the present invention, the virtual storage system 100 also enables a user to modify or remove any active upload links created. That is, any upload links in an active state (i.e., a non-expired state).

The recipient may therefore receive the upload link created and upload at least one electronic document into the electronic folder.

According to one or more embodiments, the virtual storage system locks each electronic document with encryption as it is uploaded as disclosed in the co-pending patent application entitled "Virtual Storage System and File Encryption Methods" by Ronald M. Daly, Jr. et al. filed on Jan. 28, 2013, incorporated herein in its entirety. Thus, only the user-owner holds the key (i.e., access rights) to retrieve the electronic document, thereby transferring ownership of the electronic document to the user-owner at and providing extra security protection from unauthorized individuals.

The present invention is described herein in terms of block components, screen shots, and optional selections and processing steps. It should be appreciated that the functional blocks may be realized by any number of hardware and/or software components configured to perform the specified functions. For example, the present invention may employ various integrated circuits e.g., memory elements, processing elements, logic elements, look-up tables, and others which may perform the functions under the control of one or more processors or other control devices. The software components can be implemented with any programming or scripting language, with various algorithms implemented with data structures, objects, processes, and other programming elements.

An exemplary process of the method 600 of FIG. 6 will be described with reference to the screen shots shown in FIGS. 7 and 8. Screen shots 700 and 800 shown in FIGS. 7 and 8, respectively, are implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

Figure 7:
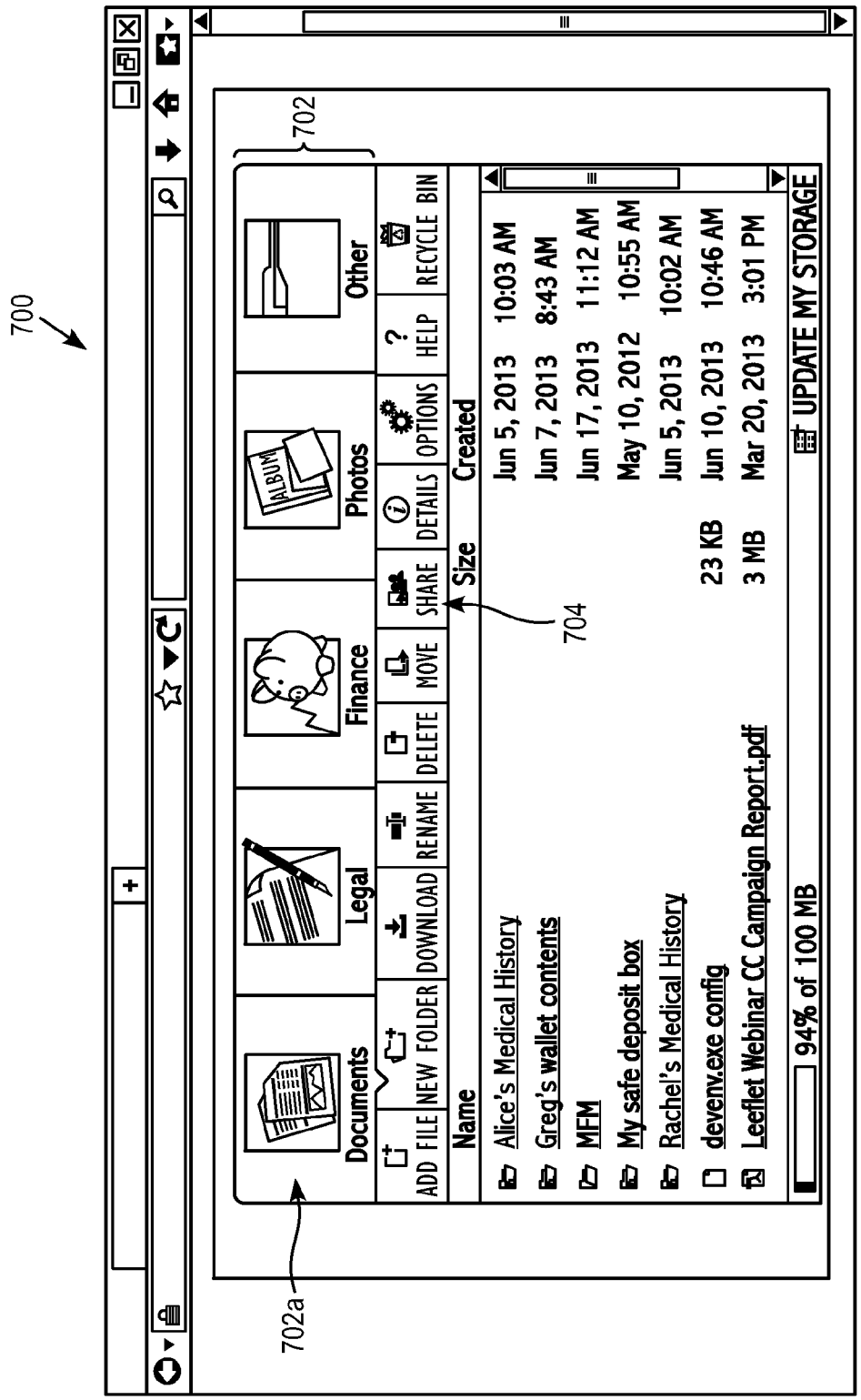
FIG. 7 is a screen shot of the virtual storage system that can be implemented within one or more embodiments of the present invention.

As shown in FIG. 7, the screen shot 700 for a user to access the virtual storage system 100 is provided. As shown, a plurality of electronic folders 702 is displayed to the user upon accessing the virtual storage system 100. The user selects at least one of the folders 702 to share access with a recipient. The user then selects the share option 704 to create an upload link corresponding to the electronic folder 702 to be shared. For example, the user may select the documents folder 702a for granted share access to the recipient to enable the recipient of the access privileges to upload electronic documents into the user's documents folder of the user-specific virtual storage system.

Figure 8:
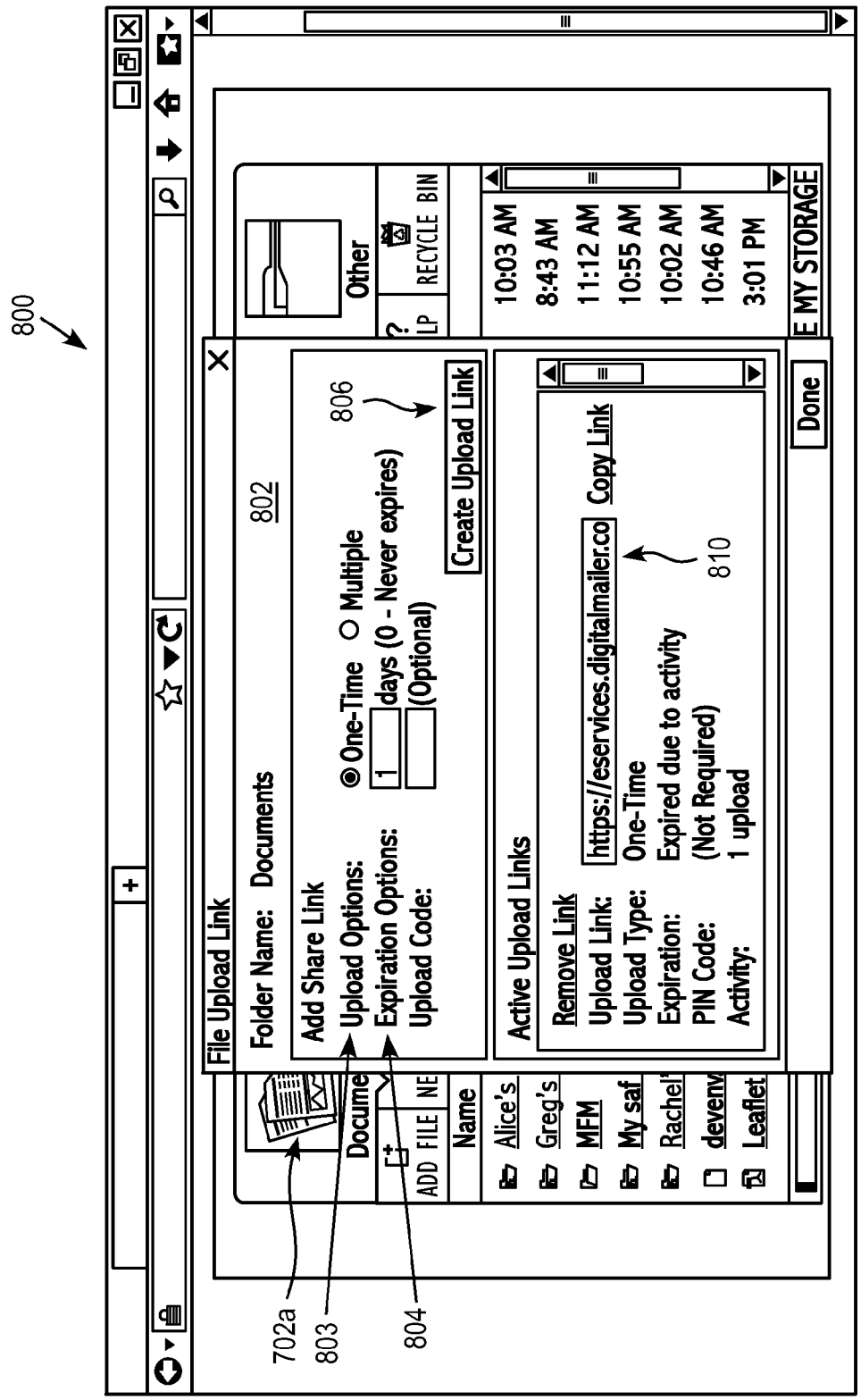
FIG. 8 is a screen shot of an upload link creation operation of the method shown in FIG. 6 that can be implemented within one or more embodiments of the present invention.

Then, as shown in FIG. 8, a screen shot 800 includes a upload link option dialog 802 displayed to the user wherein the user manipulates the upload link option dialog 802 to configure a upload link for sharing accessing to the electronic folder 702a selected by the user (operation 608 of FIG. 6). The user first determines upload link information 803, via the upload options dialog 802 (operation 610 of FIG. 6). In this embodiment, the user determines a number of times an electronic document can be uploaded to the electronic folder 702 selected. As shown, the user may select between one or multiple number of times. According to other embodiments, the user may select a specific number of times for which an electronic document can be uploaded by the recipient into the specific electronic folder 702a selected by the user of the virtual storage system. For example, the user may select that a total of five (5) uploaded activities may take place with respect to the electronic folder 702a selected.

Further, the user determines expiration information 804, via the upload options dialog 802 (operation 612 of FIG. 6). In this embodiment, the user determines an expiration period for uploading electronic documents to the electronic folder 702, by the recipient. As shown, the user may select any predetermined number of days before the upload link is to expire, for example, zero (0) days (i.e., no expiration date) or one or more days. Optionally, the user may also determine an access code to be used by the recipient to complete the uploading process of an electronic document to the virtual storage system 100.

After selecting the upload link information 803 and the expiration information 804, the user selects a create upload link option 806, to thereby create an upload link 810 based on the upload link information and the expiration information, and corresponding to the electronic folder 702 to be shared (operation 614 of FIG. 6).

FIG. 9 is a flowchart illustrating an alternative method 900 for sharing access to the virtual storage system for adding electronic documents thereto according to one or more embodiments of the present invention. In this embodiment, if the virtual storage system 100 is linked directly to an external system (e.g., a banking system 70), an authorized party at the external system may have share access of the user's virtual storage system 100, to add electronic documents to the user's virtual storage system 100.

According to one or more embodiments, the authorized party may upload an electronic document to one account or multiple accounts by different users or the same users, as needed. As shown FIG. 9, the method begins at operation 902 where a list of accounts is accessed, via the authorized party, and displayed at the external system.

From operation 902, the process continues to operation 904, where the authorized party at the external system can select an account of a user having a user-specific virtual storage system 100 to gain access to and add electronic documents. For example, if a user has applied for a loan at the banking system 70, the representative at the banking system 70 may be granted access to the user's virtual storage system 100 by the user, to add the loan documents to the user's virtual storage system 100.

According to one or more embodiments, the authorized party is able to upload documents and is not able to download (i.e., open) any electronic documents previously uploaded to the plurality of electronic folders of the user's virtual storage system 100. Thus, the authorized party may only access the electronic folder(s) for the purpose of adding electronic documents thereto.

According to one or more embodiments, the authorized party of the external system may have predefined share access to any virtual storage system 100 of an account holder of the external system (e.g., the banking system 70).

According to one or more alternative embodiments, the user may create and modify a predetermined access list via a user interface (e.g., the user computing device 50) for which the user grants share access to third parties (e.g., the authorized party of the external system 70) and to specific electronic folders of the plurality of electronic folders 702 (as depicted in FIG. 7).

According to the alternative embodiments, the user may grant share access to the authorized party or other third parties of the predetermined access list by selecting upload information and expiration information, for example, as discussed above with reference to method 600 as shown in FIG. 6.

From operation 904, the process continues to operation 906 where the authorized party accesses the electronic folder of the user's virtual storage system 100 as selected by the authorized party or by the user in accordance with the above-mentioned embodiments, and selects an add link to add an electronic document to the electronic folder selected.

From operation 906, the process continues to operation 908 where the authorized party then selects and uploads an electronic document to the electronic folder selected.

From operation 908, the process may continue to operation 910 where if an electronic document is uploaded by the authorized party in error, the authorized party may optionally delete the uploaded electronic document if necessary. The authorized party may either re-upload the electronic document or upload a different electronic document as desired.

An exemplary process of the method 900 of FIG. 9 will be described with reference to the screen shots shown in FIGS. 10 through 13. Screen shots 1000 through 1300, are implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

As shown in FIG. 10, the screen shot 1000 for an authorized party to access a list of accounts 1001 is displayed at the external system (e.g., the banking system 70). Account information including the account number and user information (e.g., name and contact information) is displayed to the authorized party. If the user of a respective account 1001 has a virtual storage system 100, an icon 1002 is displayed next to the account number of the respective account 1001 of the user. The authorized party at the external system can select an account 1001 of a user having a user-specific virtual storage system 100 to gain access to and add electronic documents.

Figure 11:
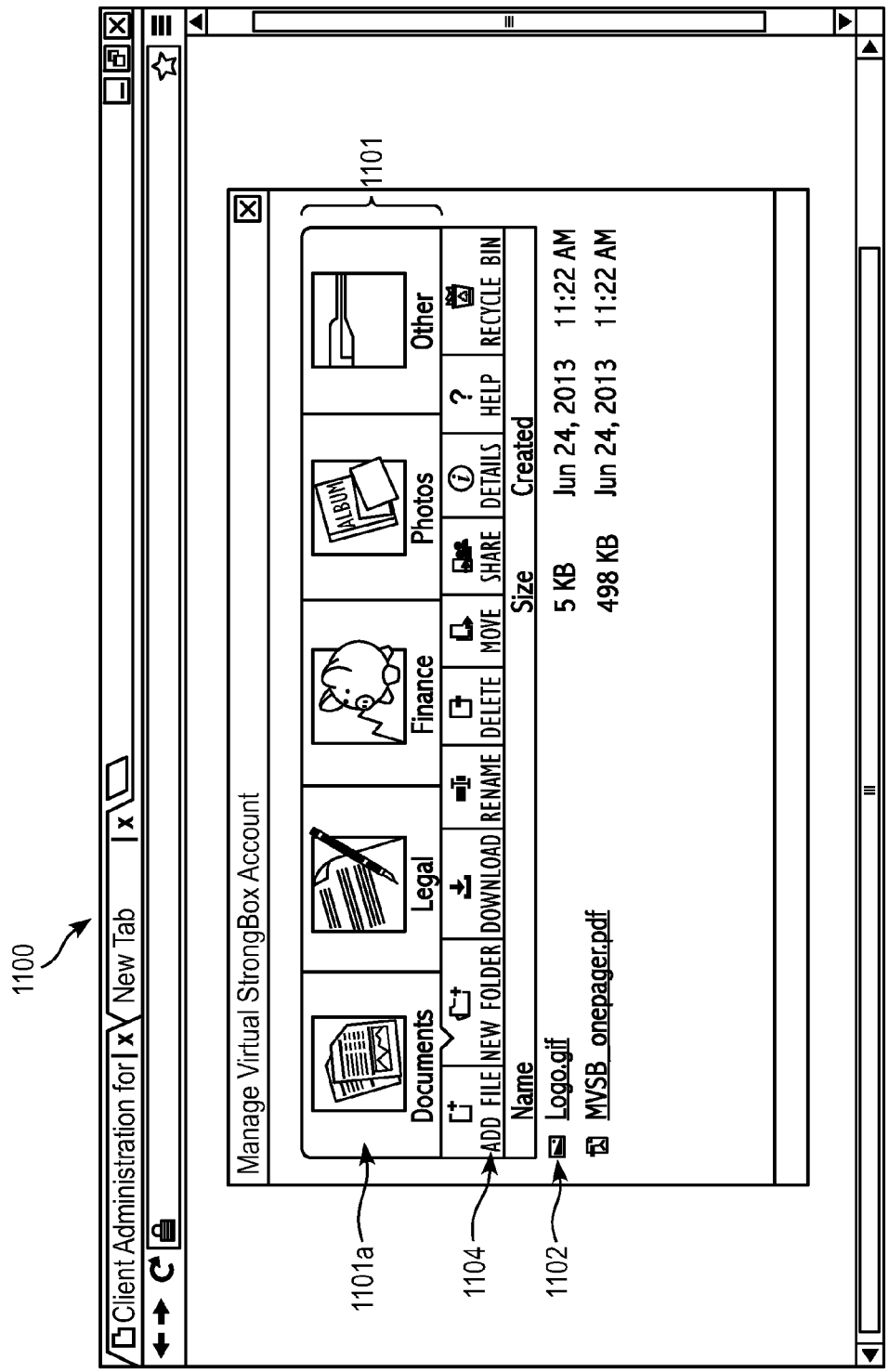
FIG. 11 is a screen shot of an add operation of the method shown in FIG. 9 that can be implemented within one or more embodiments of the present invention.

As shown in FIG. 11, a screen shot 1100 illustrates the user's virtual storage system 100 as accessed by the authorized party. In this embodiment, the authorized party accesses a document electronic folder 1101*a* of the plurality of electronic folders 1101. The authorized party accesses the document electronic folder 1101*a* of the user's virtual storage system 100 as selected by the authorized party or by the user, and selects an add link 1104 to add an electronic document to the document electronic folder 1101*a* selected.

Figure 12:
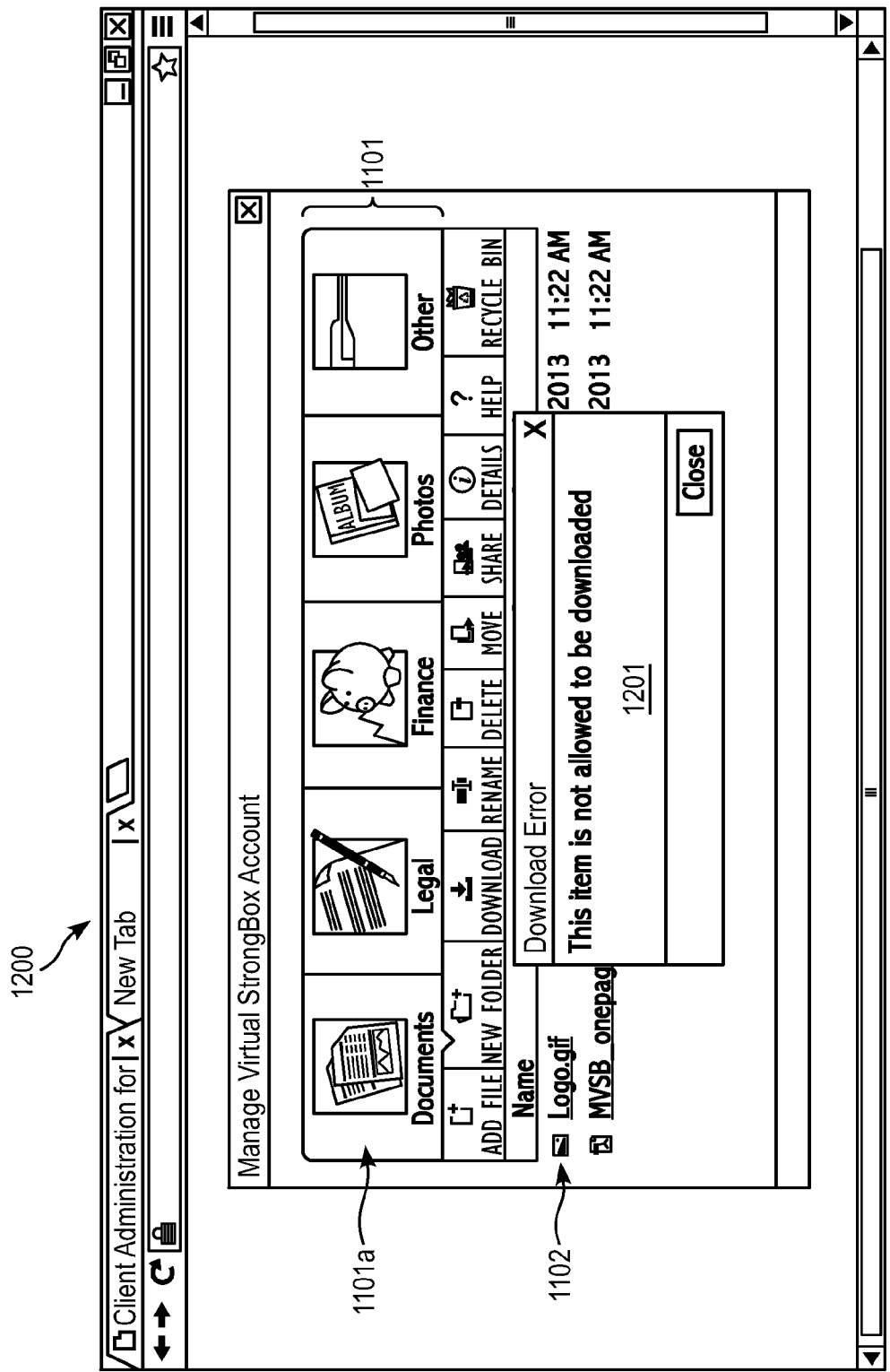
FIG. 12 is a screen shot of a download error operation that can be implemented within one or more embodiments of the present invention.

According to one or more embodiments, as shown in screen shot 1200 of FIG. 12, the authorized party may view a name of electronic documents 1102 (e.g., the logo.gif document) within the document electronic folder 1101*a* selected, as previously uploaded by the authorized party. However, the authorized party is unable to download the previously uploaded electronic document 1102. Upon selection of the previously uploaded document 1102, a download error 1201 is displayed indicating to the authorized party that this item is not allowed to be downloaded. Therefore, according to one or more embodiments, the authorized party has limited access to the user's virtual storage system 100. Thus, embodiments of the present invention provided added security of the user's electronic documents within the virtual storage system According to one or more alternative embodiments, the authorized party may have modification privileges and therefore is able to download, delete or modify a previously uploaded document as uploaded by the authorized party, or any other existing electronic documents within the virtual storage system 100. In this embodiment, the authorized party may select the uploaded electronic document to be modified or deleted and perform a deletion or modification operation and then re-upload the electronic document or select a different electronic document to be uploaded to the virtual storage system 100.

Figure 13:
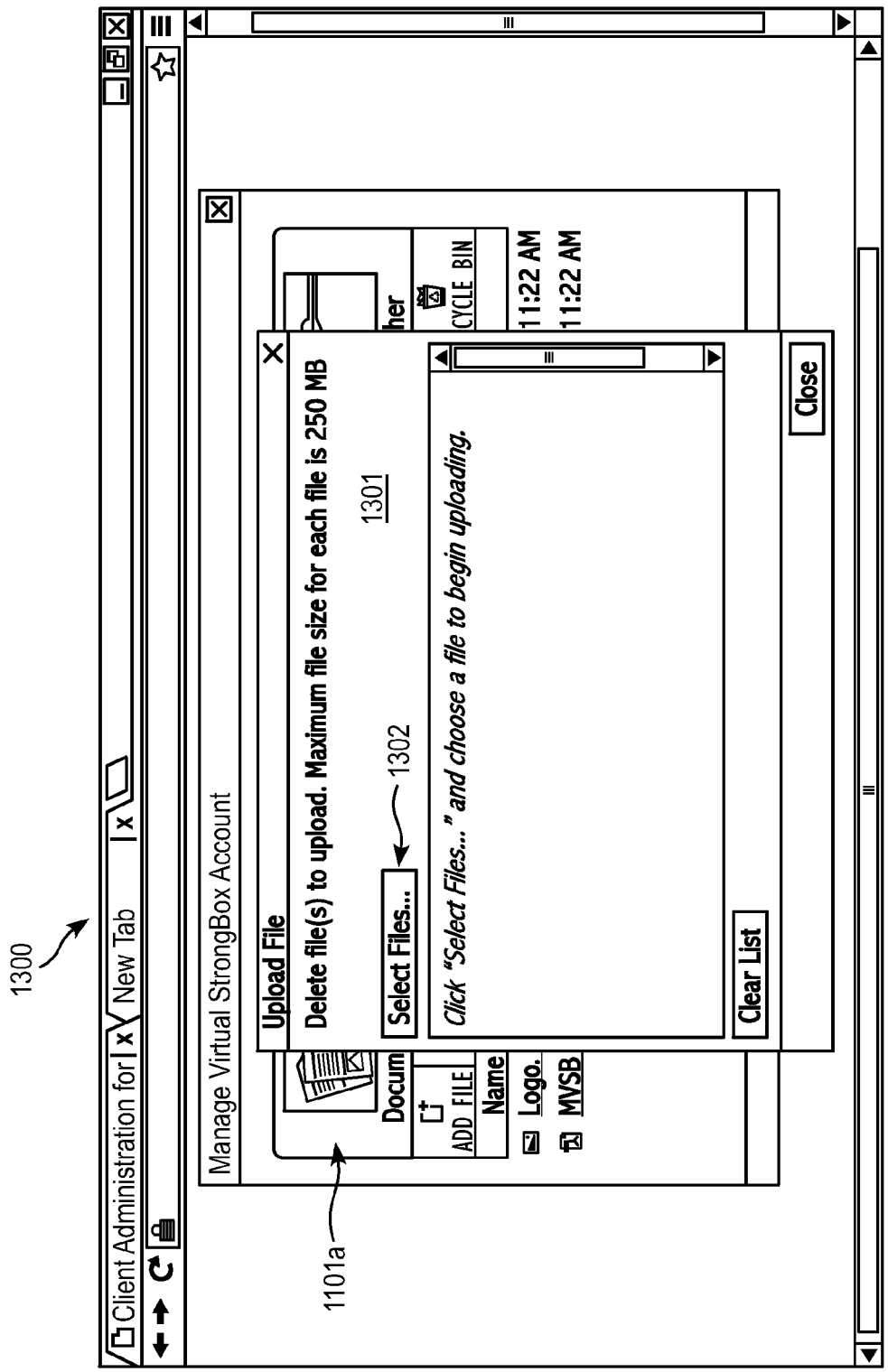
FIG. 13 is a screen shot of an upload file operation of the method shown in FIG. 9 that can be implemented within one or more embodiments of the present invention.

As shown in FIG. 13, a screen shot 1300 illustrates an upload operation for adding electronic documents to the virtual storage system 100. As shown in FIG. 13, an upload file options dialog 1301 is displayed to the authorized party. The authorized party may then choose a select files option 1302 to thereby select an electronic document to be uploaded into the user's virtual storage system 100.

Figure 14:
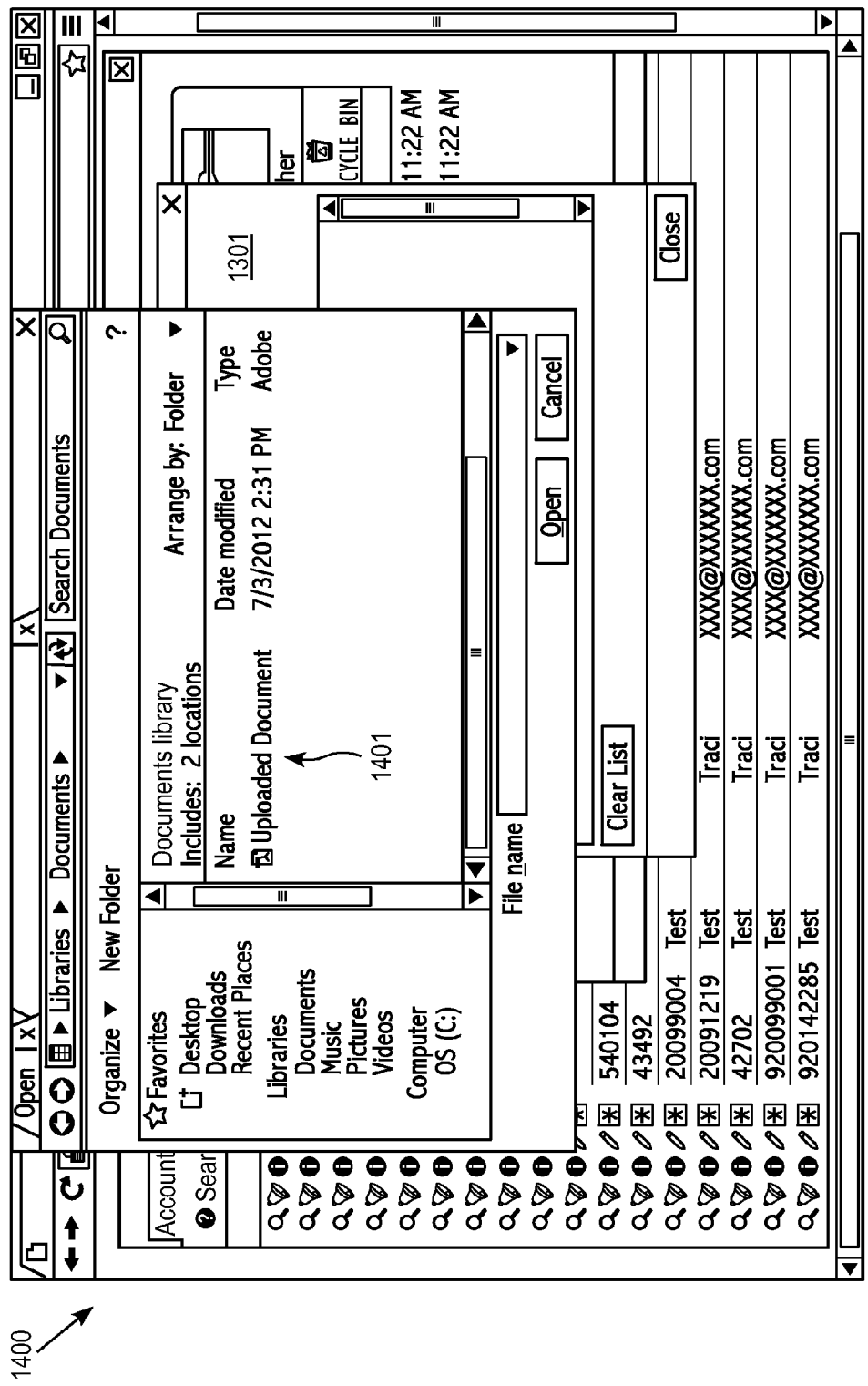
FIG. 14 is a screen shot of a file selection operation of the upload file operation show in FIG. 13 that can be implemented within one or more embodiments of the present invention.

As shown in FIG. 14, a screen shot 1400 illustrates a file selection operation where the authorized party selects an electronic document to be uploaded into the virtual storage system 100.

Figure 15:
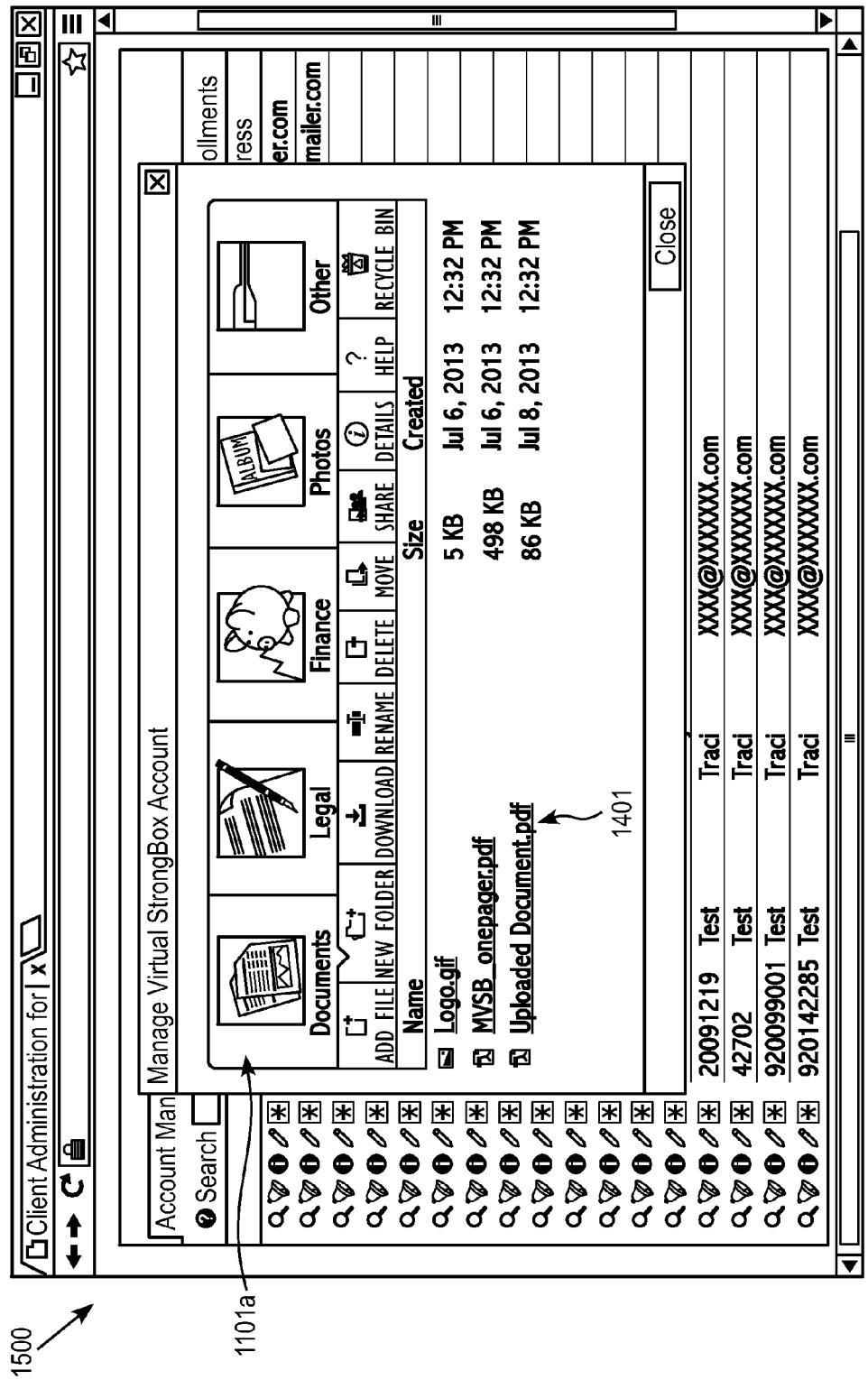
FIG. 15 is a screen shot of a file selected via the file selection operation shown in FIG. 14, as uploaded to the virtual storage system according to one or more embodiments of the present invention.

As shown in FIG. 15, a screen shot 1500 illustrates a file as selected via the file selection operation shown in FIG. 14, being uploaded to the document electronic folder 1101*a* selected by the authorized party or the user.

In view of the above, the present method embodiment may therefore take the form of a computer or controller implemented processes and apparatuses for practicing those processes. This disclosure can also be embodied in the form of computer program code containing instructions embodied in tangible media, such as floppy diskettes, CD ROMs, hard drives, or any other computer-readable storage medium, wherein, when the computer program code is loaded into and executed by a computer or controller, the computer becomes an apparatus for practicing the invention. This disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

According to one or more embodiments, a virtual storage system in data communication with a user computing device via a communication network is provided. The virtual storage system includes at least one processor that receives a request for granting share access of at least one electronic folder of a plurality of electronic folders, and for adding at least one electronic document therein, and input information including upload link information and expiration information corresponding to the share access of the electronic folder, as input by a user, and creates at least one upload link corresponding to the electronic folder based on the input information, for granting share access to a recipient of the at least one upload link. The virtual storage system also includes a plurality of redundant physical storage devices in data communication with the processor and storing the electronic document to be uploaded, and the upload link created.

According to one or more embodiments, a method implemented by computer system to effect the granting of share access of at least one electronic folder of a plurality of electronic folders within a virtual storage system including at least one processor in data communication via a communication network with a user computing device, and a plurality of redundant storage devices is provided. The method includes accessing the virtual storage system via the user computing device, selecting and viewing the at least one electronic folder of the plurality of electronic to be shared with a recipient, receiving from the user computing device, a request for granting share access of the at least one electronic folder, determining, via the user, upload link information corresponding to the share access to the at least one electronic folder, determining, via the user, expiration information corresponding to the uploading of the at least one electronic document to the at least one electronic folder, creating at least one upload link corresponding to the share access based on the upload link information and the expiration information, for granting share access of the at least one electronic folder with a recipient, and storing, via the physical redundant storage devices, the at least one electronic document and the at least one upload link created.

According to one or more embodiments, a method implemented by computer system to effect the granting of share access of at least one electronic folder of a plurality of electronic folders within a virtual storage system including at least one processor in data communication via a communication network with a user computing device, and a plurality of redundant storage devices is provided. The method includes accessing, via a party, an external system in data communication with the virtual storage system of a user, accessing, via the party, an account of the external system corresponding to the virtual storage system, accessing, via the party, the virtual storage system and at least one electronic folder of the plurality of electronic folders, uploading, via the party, at least one electronic document to the at least one electronic folder, and storing, via the physical redundant storage devices, the at least one electronic document.

According to one or more embodiments, a computer readable medium storing computer executable instructions that, when executed, cause a computing device to perform a method of granting share access of at least one electronic document of a plurality of electronic documents within a virtual storage system including at least one processor in data communication via a communication network with a user computing device, and a plurality of redundant storage devices is provided. The method includes accessing the virtual storage system via the user computing device, selecting and viewing the at least one electronic folder of the plurality of electronic to be shared with a recipient, receiving from the user computing device, a request for granting share access of the at least one electronic folder, determining, via the user, upload link information corresponding to the share access to the at least one electronic folder, determining, via the user, expiration information corresponding to the uploading of the at least one electronic document to the at least one electronic folder, creating at least one upload link corresponding to the share access based on the upload link information and the expiration information, for granting share access of the at least one electronic folder with a recipient, and storing, via the physical redundant storage devices, the at least one electronic document and the at least one upload link created.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A virtual storage system in data communication with a user computing device via a communication network, the virtual storage system comprising:
   at least one processor configured to:
      receive from the user computing device,
         a request for granting share access of at least one electronic folder of a plurality of electronic folders associated with an account of at least one user of the virtual storage system, and for adding at least one electronic document therein, and
         input information including upload link information and expiration information corresponding to the share access of the at least one electronic folder, that is input by an authorized user of an external system, wherein the expiration information comprises an expiration period for accessing the at least one electronic folder and for uploading electronic documents by a recipient, the external system is an online document retrieval and storage system residing on another communication network separate from the virtual storage system and the authorized user is different from the at least one user of the virtual storage system and the external system is different from the virtual storage system,
      create at least one upload link corresponding to the at least one electronic folder based on the input information, for granting share access to the recipient of the at least one upload link, wherein the upload link information comprises a predetermined number of uploading times for uploading electronic documents via the recipient of the at least one upload link;
      determine an access code to be input by the recipient to complete uploading of the at least one electronic document, wherein the access code is included in the at least one upload link created;
      copy the at least one upload link created to a communication to the recipient or generating a communication to the recipient within the virtual storage system, for sending the at least one upload link created to the recipient; and
   a plurality of redundant physical storage devices located in redundant data centers in data communication with the at least one processor and each configured to store the at least one electronic document to be uploaded, and the at least one upload link created.

2. The virtual storage system of claim 1, wherein the at least one processor is further configured to: receive and process the at least one electronic document uploaded by the recipient into the at least one electronic folder.

3. The virtual storage system of claim 1, further comprising: a web interface configured to interface the virtual storage system with the external system and the user computing device, via at least one communication network.

4. The virtual storage system of claim 1, wherein the external system further comprises a web interface configured to interface the external system with the virtual storage system.

5. The virtual storage system of claim 1, wherein the user computing device comprises a web application configured to interface the user computing device with the virtual storage system, via the external system.

6. The virtual storage system of claim 1, wherein the user computing device comprises a native application configured to interface the user computing device directly with the virtual storage system.

7. The virtual storage system of claim 1, wherein the online document retrieval and storage system is a banking system.

8. A method implemented by computer system to effect the granting of share access of at least one electronic folder of a plurality of electronic folders within a virtual storage system including at least one processor in data communication via a communication network with a user computing device, and a plurality of redundant storage devices located in redundant data centers, the method comprising:
   accessing the virtual storage system via the user computing device;
   selecting and viewing the at least one electronic folder of the plurality of electronic to be shared with a recipient;
   receiving from the user computing device by an authorized user of an external system comprising an online document retrieval and storage system residing on another communication network separate from the virtual storage system and, a request for granting share access of the at least one electronic folder;
   determining, via the user computing device, upload link information corresponding to the share access of the at least one electronic folder, wherein determining upload link information comprises determining a number of uploading times for uploading electronic documents by the recipient and the authorized user of the external system is different from the user of the virtual storage system and the external system is different from the virtual storage system;
   determining, via the user computing device, expiration information corresponding to the uploading of the at least one electronic documents to the at least one electronic folder, wherein determining expiration information comprises determining an expiration period for accessing the at least one electronic folder and for uploading electronic documents by the recipient;
   creating at least one upload link corresponding to the share access of the at least one electronic folder based on the upload link information and the expiration information, for granting share access of the at least one electronic folder with a recipient;

storing, via the physical redundant storage devices, the at least one electronic document and the at least one upload link created;

determining an access code to be input by the recipient to complete uploading of the at least one electronic document, wherein the access code is included in the at least one upload link created; and copying the at least one upload link created to a communication to the recipient or generating a communication to the recipient within the virtual storage system, for sending the at least one upload link created to the recipient.

9. A non-transitory computer readable medium storing computer executable instructions that, when executed, cause a computing device to perform a method of granting share access of at least one electronic folder of a plurality of electronic folders within a virtual storage system including at least one processor in data communication via a communication network with a user computing device, and a plurality of redundant storage devices located in redundant data centers, the method comprising:

accessing the virtual storage system via the user computing device;

selecting and viewing the at least one electronic folder of the plurality of electronic folders to be shared with a recipient;

receiving from the user computing device by an authorized user of an external system comprising an online document retrieval and storage system residing on another communication network separate from the virtual storage system and, a request for granting share access of the at least one electronic folder;

determining, via a user computing device, upload link information corresponding to the share access of the at least one electronic folder, wherein determining upload link information comprises determining a number of uploading times for uploading of at least one electronic document by a recipient and the authorized user of the external system is different from the user computing device and the external system is different from the virtual storage system;

determining, via the user computing device, expiration information corresponding to the uploading of the at least one electronic document to the at least one electronic folder;

creating at least one upload link corresponding to the share access of the at least one electronic folder based on the upload link information and the expiration information, for granting share access of the at least one electronic folder with the recipient; and storing, via the physical redundant storage devices, the at least one electronic document and the at least one upload link created;

determining an access code to be input by the recipient to complete uploading of the at least one electronic document, wherein the access code is included in the at least one upload link created; and copying the at least one upload link created to a communication to the recipient or generating a communication to the recipient within the virtual storage system, for sending the at least one upload link created to the recipient.

\* \* \* \* \*